(12) United States Patent
Mayer et al.

(10) Patent No.: US 12,110,082 B1
(45) Date of Patent: Oct. 8, 2024

(54) FLAT-PACK MEMBRANE BASED SOLAR PV ARRAY FLOATS HAVING DEPLOYABLE EXPANSION STRUCTURES THAT INFLATE THE FLOATS WITHOUT FORCED AIR PRELIMINARY CLASS

(71) Applicant: NORIA ENERGY, Sausalito, CA (US)

(72) Inventors: Alex Mayer, Mill Valley, CA (US); James Raiford, San Francisco, CA (US); Brian Atchley, Petaluma, CA (US); Jason King, San Francisco, CA (US); Ralf Schulze, San Francisco, CA (US); Leslie Arciniega, Ann Arbor, MI (US); Becca Suchower, Sausalito, CA (US)

(73) Assignee: NORIA ENERGY, Sausalito, CA (US)

( * ) Notice: Subject to any disclaimer, the term of this patent is extended or adjusted under 35 U.S.C. 154(b) by 0 days.

(21) Appl. No.: 18/516,275

(22) Filed: Nov. 21, 2023

(51) Int. Cl.
*B63B 35/44* (2006.01)
*B63B 7/08* (2020.01)
*H02S 20/00* (2014.01)

(52) U.S. Cl.
CPC ............... *B63B 35/44* (2013.01); *B63B 7/08* (2013.01); *B63B 2035/4453* (2013.01); *H02S 20/00* (2013.01)

(58) Field of Classification Search
CPC ... B63B 35/44; B63B 7/08; B63B 2035/4453; H02S 20/00
See application file for complete search history.

(56) References Cited

U.S. PATENT DOCUMENTS

| | | | |
|---|---|---|---|
| 6,897,832 B2 * | 5/2005 | Essig, Jr. | E04H 15/38 |
| | | | 343/915 |
| 2017/0324373 A1 * | 11/2017 | Shanfelt | H02S 40/44 |
| 2018/0119994 A1 * | 5/2018 | Helming | F24S 20/70 |
| 2021/0058022 A1 * | 2/2021 | Forrest | F24S 25/636 |
| 2022/0190773 A1 * | 6/2022 | Selten | H01L 31/048 |
| 2022/0224279 A1 * | 7/2022 | Zimmermann | H02S 10/40 |
| 2022/0231633 A1 * | 7/2022 | Cavalli | F24S 20/70 |

* cited by examiner

*Primary Examiner* — S. Joseph Morano
*Assistant Examiner* — Jovon E Hayes
(74) *Attorney, Agent, or Firm* — David R. Heckadon; Gordon Rees Scully Mansukhani LLP

(57) ABSTRACT

An expandable flat-pack membrane-based float for use with a floating solar PV array, including: a float formed from a flexible membrane; and an expansion structure that is deployed to support the float in the inflated position without the need for compressed air. The expansion structure may be an expandable structure that is positioned within the float, or around an exterior surface of the float and increases in size when deployed.

20 Claims, 17 Drawing Sheets

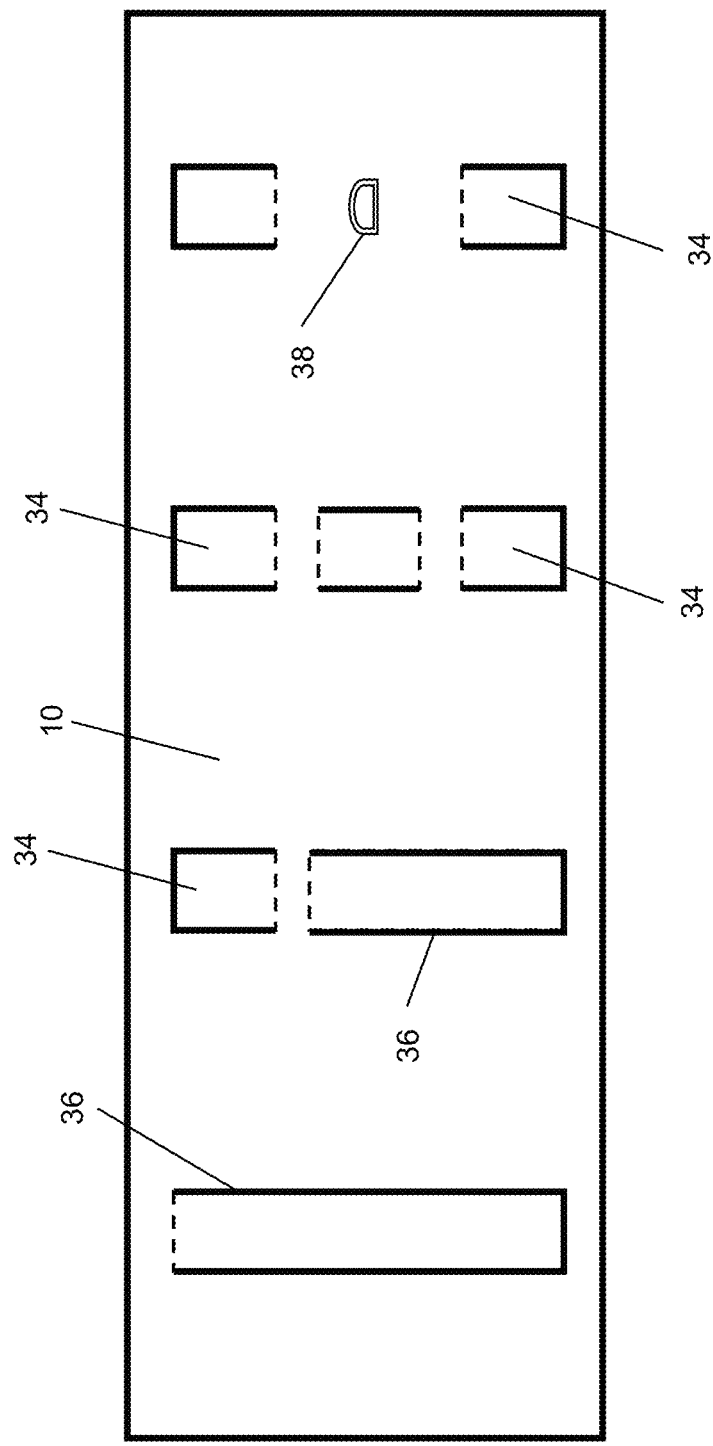

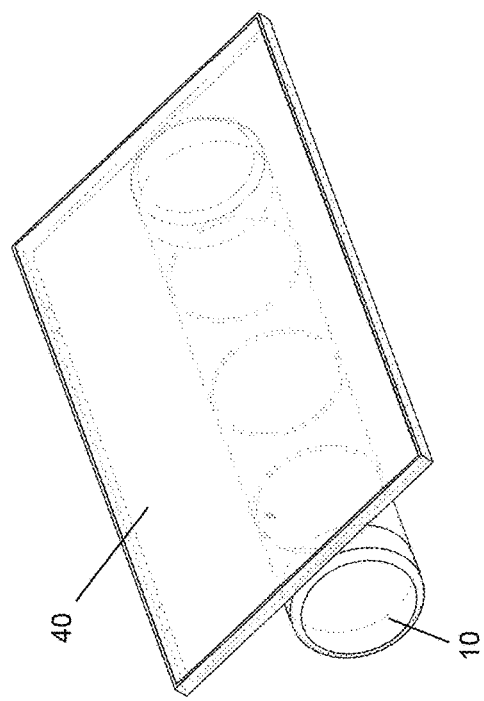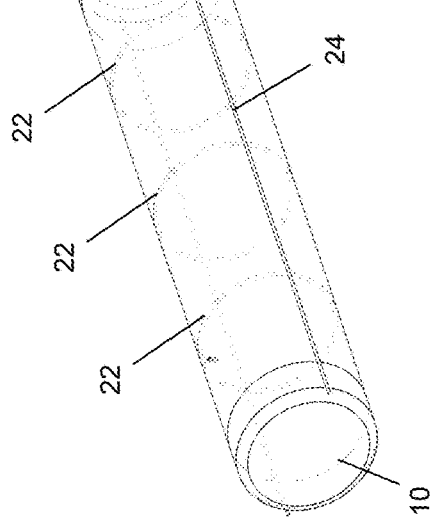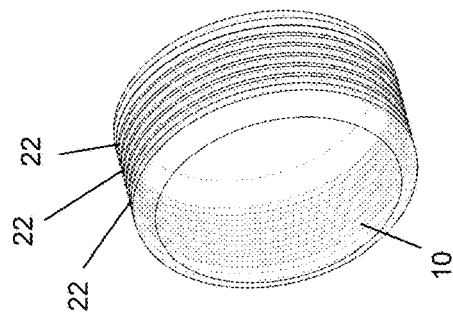

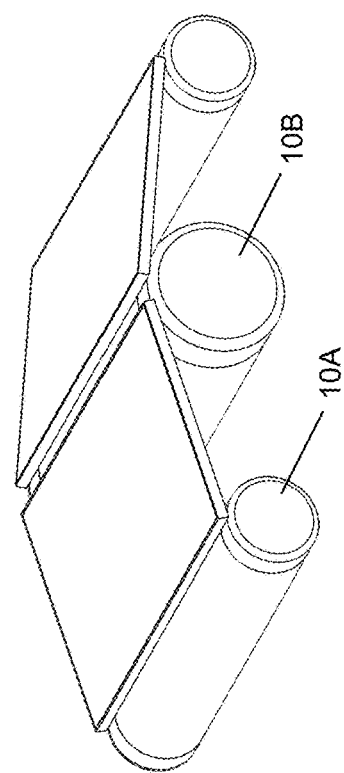
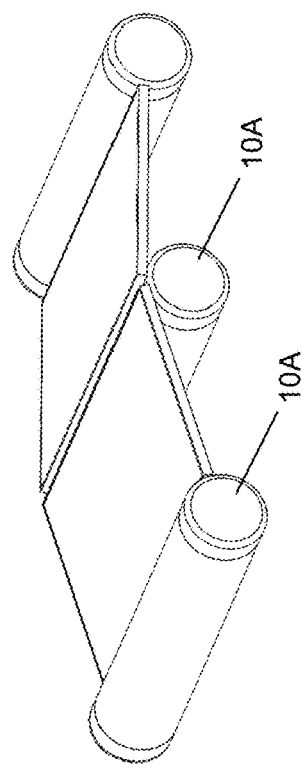
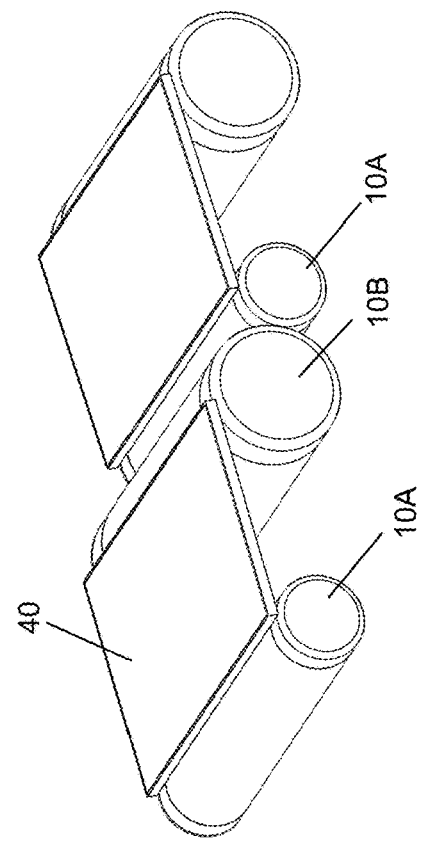
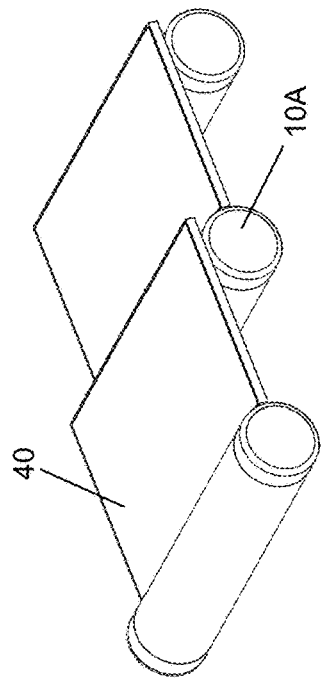

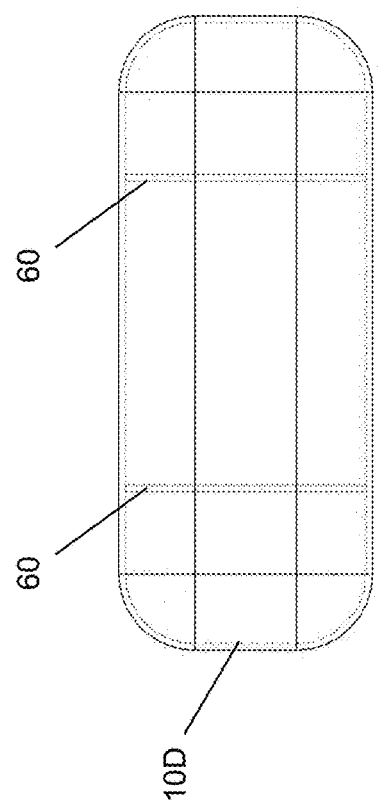
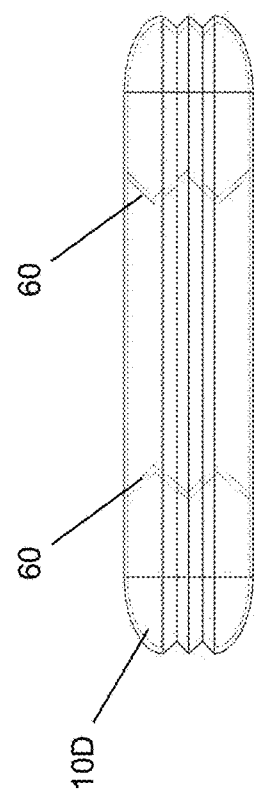
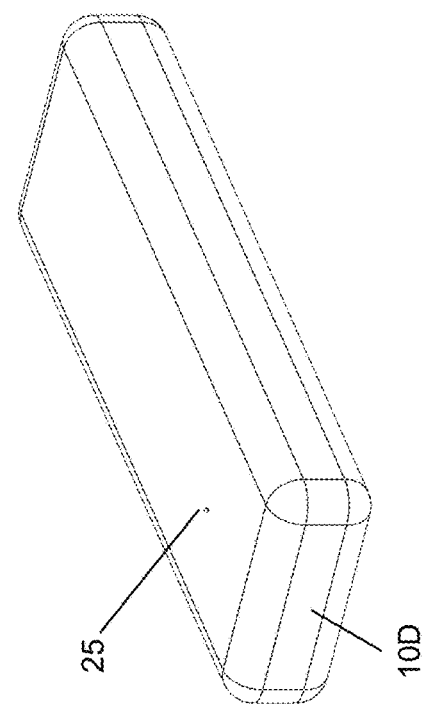

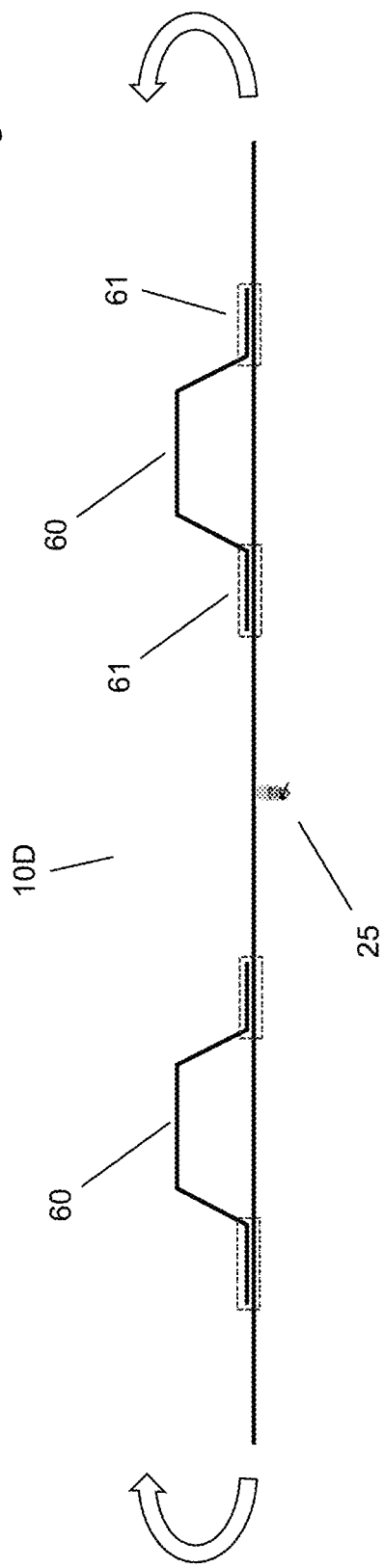
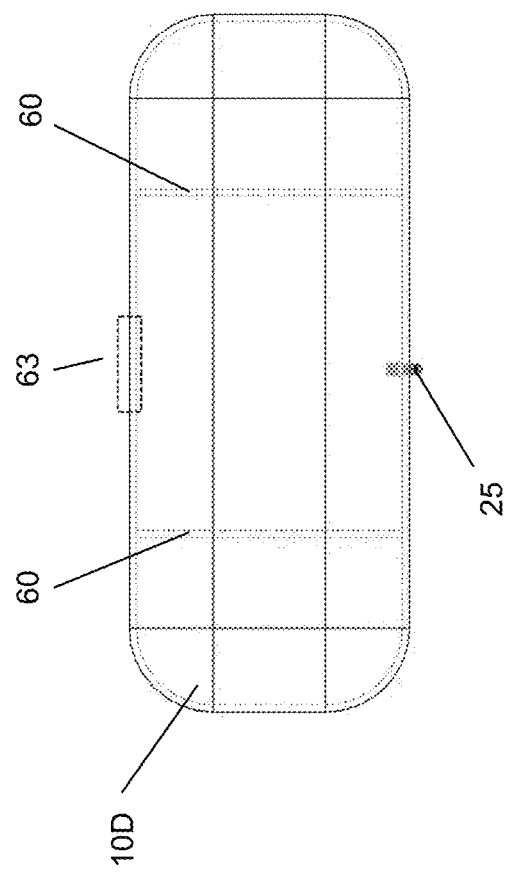

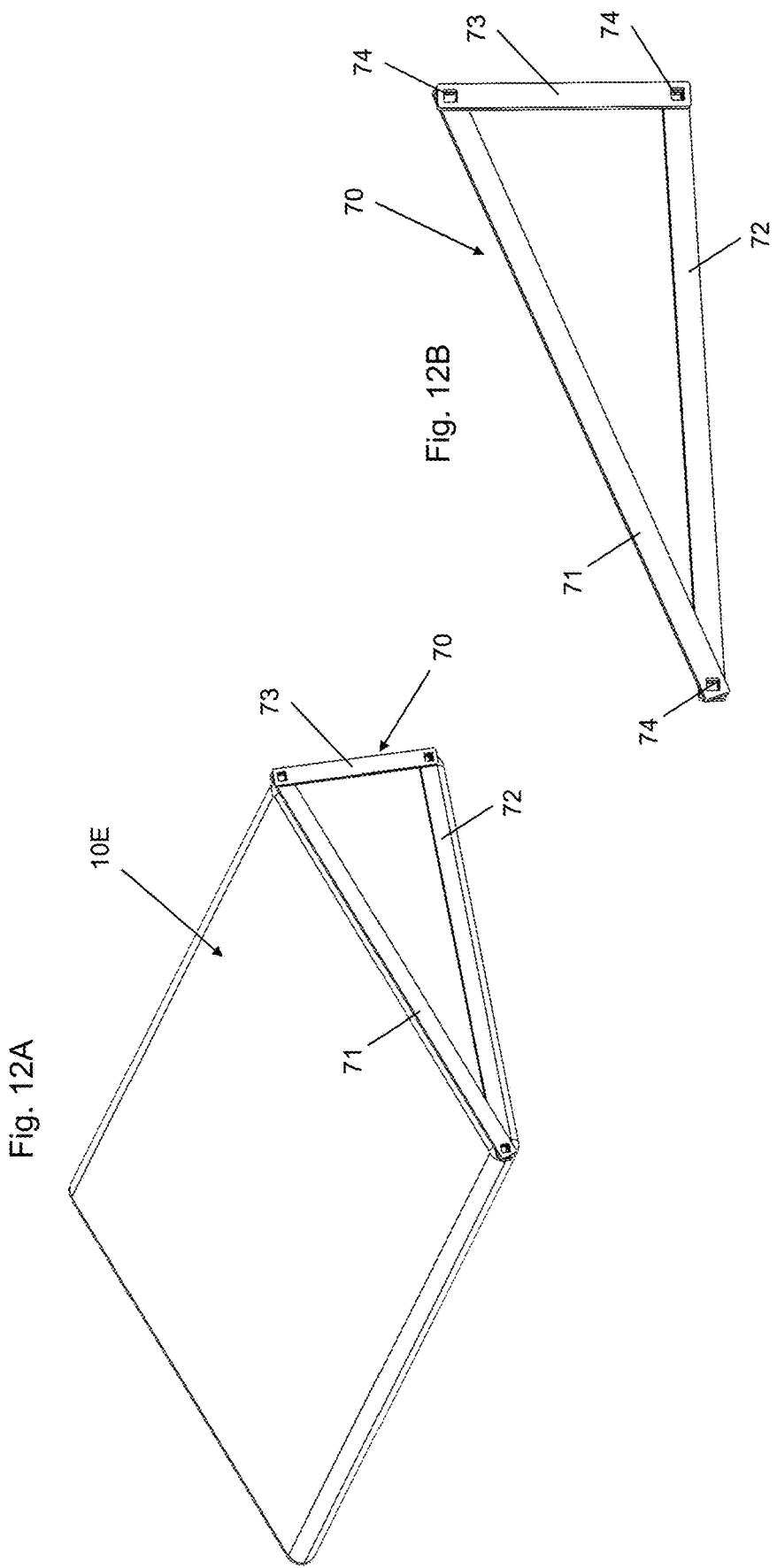

FLAT-PACK MEMBRANE BASED SOLAR PV ARRAY FLOATS HAVING DEPLOYABLE EXPANSION STRUCTURES THAT INFLATE THE FLOATS WITHOUT FORCED AIR PRELIMINARY CLASS

TECHNICAL FIELD

The present invention relates to floats that support floating solar PV arrays thereon.

BACKGROUND OF THE INVENTION

Existing floating solar PV arrays are typically supported by floats made from rigid plastic (such as high-density polyethylene, HDPE) that are hollow and sealed with ambient pressure air inside. The rigid plastic shell gives structure to the float and allows it to maintain its shape. The disadvantage of such large, rigid floats is that they take up considerable volume during shipping and storage in warehouses and at jobsites. What would instead be desired is a floating solar array float that does not require such a large shipping footprint.

Secondly, although inflatable floats do exist, these floats are typically inflated at the jobsite by forcing compressed air into them. The compressed air source is used to inflate each of the floats one at a time at the jobsite. To simplify and speed up installation, it would instead be desirable to provide a float system that doesn't rely on a supply of compressed air at the jobsite to inflate the floats.

Third, a common problem with inflatable floats that require compressed air to maintain their shape is that they can lose pressure and partially deflate over time. This of course can reduce buoyancy and cause problems supporting the weight of the array over time. As floats slowly deflate, maintenance personnel and equipment are constantly both monitoring the floats' air pressures and adding air to floats as required. This requires automatic air supply systems onsite or personnel accessing the floats on the water and bringing compressed air inflation equipment with them. It would instead be desired to provide systems that simply diminish the likelihood of the floats deflating in the first place (as this would both cut maintenance requirements and improve overall system performance).

SUMMARY OF THE INVENTION

The present invention provides flat-pack, membrane-based floats which can be shipped to a jobsite and then easily inflated to their final shape. The advantage of the present system is that the uninflated floats take up far less volume during shipping than do standard rigid floats. As such, shipping costs and volumes can be considerably decreased.

The present invention also provides various expansion structures which permit the floats to be inflated and maintain their shape without the need for compressed air. The advantage of this approach is that it decreases costs, simplifies system maintenance, and improves system reliability. Importantly, it also increases the speed of system installation. This is because different floats can be inflated simultaneously by different installers. Installation times are not reliant on limited air inflation equipment available at the site.

The present expansion structures also advantageously keep the floats in their final shape by mechanically holding the floats in their inflated positions without compressed air. This has the advantage of counteracting leaks from the floats. Simply put, an inflatable float with an expansion structure is less likely to deflate and lose its shape in the event of a leak as compared to an inflatable float pressurized with compressed air. As will also be shown, the present expansion structures may be inside the float, outside the float or both.

In preferred aspects, the present membrane float can be packed flat (i.e.: laid flat and uninflated) for shipping. Using a flat-pack membrane float design reduces shipping density significantly. This is because many more uninflated membrane floats can be shipped in the same volume than would be the case with standard fully inflated hard plastic floats. Also, the present membrane floats reduce the amount of plastic used in floating solar arrays (as compared to arrays with standard rigid plastic floats).

After inflation, the present float retains its inflated shape by an expansion structure attached thereto. The expansion structure both assists in inflating the float (so that compressed air inflation equipment is not needed) and assists in keeping the float in its fully inflated position after it has been inflated.

In one preferred aspect, the present system provides an expandable flat-pack membrane float system for use with a floating solar PV array, comprising: (a) a float formed from a flexible membrane, wherein the float can be deformed between an uninflated flat-pack position and an inflated position; (b) a sealable air-entry valve on the float; and (c) an expansion structure connected to the float, wherein the expansion structure is deployed to support the float in its inflated position. The float is inflated by opening the sealable air-entry valve to permit air to enter the float when the expansion structure is deployed. The flexible membrane may optionally be made of any one of: HDPE, low-density polyethylene (LDPE), polyethylene terephthalate (PET), thermoplastic polyolefin (TPO), or ethylene propylene diene monomer (EPDM).

In various aspects, the expansion structure may be positioned within the float or around an exterior surface of the float, or both. When deployed, the expansion structure may optionally have the same general shape as the float and helps in keeping the float in its inflated position.

In various aspects, the present float may be cylindrical or trapezoidal in shape with an angled top surface. Other geometries are also possible. In preferred aspects, one float may support a single PV module mounted thereon or a pair of floats may support a single PV module mounted thereon. When a pair of floats support a single PV module, an optional membrane may be wrapped around the pair of floats to give the system a more solid structure.

The expansion structure may optionally be an expandable frame that is folded when the float is in its uninflated position and is unfolded when the float is in its inflated position. In some aspects, the float is cylindrical and the expansion structure comprises a series of compressible hoops positioned inside the float. In other aspects, the float is cylindrical and the expansion structure comprises a series of poles wrapped around the exterior surface of the float, with a mounting system for connecting the series of poles to an exterior surface of the float. Such mounting system may optionally comprise pockets or sleeves on an exterior surface of the float, and attachment clamps may also be used on the exterior surface of the float.

The expansion structure may also be a series of parallel hoops wrapping around the circumference of the float, with the parallel hoops positioned close together when the float is in its uninflated position, and farther apart when the float is in its inflated position. Parallel rods running along the length of the cylindrical float may also be included.

In further aspects, the expansion structure may also be a folded internal wall or other form of pop-up structure within the float.

BRIEF DESCRIPTION OF THE DRAWINGS

FIG. 4 is an illustration of a flat-pack membrane float in its deflated position, showing sleeves and pockets welded on its exterior surface during manufacture.

FIG. 5A is a perspective illustration of a flat-pack membrane float in a deflated position with an internal expansion structure in its non-deployed position. The internal expansion structure comprises flexible hoops positioned next to one another.

FIG. 5B is a perspective illustration of the flat-pack membrane of FIG. 5A in an inflated position with external expansion rods inserted to inflate the float such that the flexible hoops are now positioned farther apart from one another.

FIG. 5C shows a PV module attached onto the top of the float of FIG. 5B.

FIG. 8A is a simplified illustration of two south-facing rows of PV modules, with each PV module supported by a pair of floats of different sizes.

FIG. 8B is a simplified illustration of two south-facing rows of PV modules, with each PV module supported by shared floats of the same size.

FIG. 8C is a simplified illustration of two east-west facing rows of PV modules, with each PV module supported by shared floats of different sizes.

FIG. 8D is a simplified illustration of two east-west facing rows of PV modules, with each PV module supported by shared floats of the same size.

FIG. 10A is a perspective view of a rectangular-shaped membrane float in its fully inflated state.

FIG. 10B is a sectional elevation view of the rectangular-shaped float of FIG. 10A in its deflated state, showing collapsed internal ribs.

FIG. 10C is a sectional elevation view of the rectangular-shaped float of FIG. 10A in its inflated state, showing expanded internal ribs.

FIG. 10D illustrates a first step in a method of manufacturing the rectangular-shaped float of FIG. 10A.

FIG. 10E illustrates a second step in a method of manufacturing the rectangular-shaped float of FIG. 10A.

FIG. 12A is an illustration of a triangular-shaped membrane float.

FIG. 12B is an illustration of an external three-member expansion structure for use with the triangular-shaped membrane float of FIG. 12A.

DETAILED DESCRIPTION OF THE DRAWINGS

Figure 1:
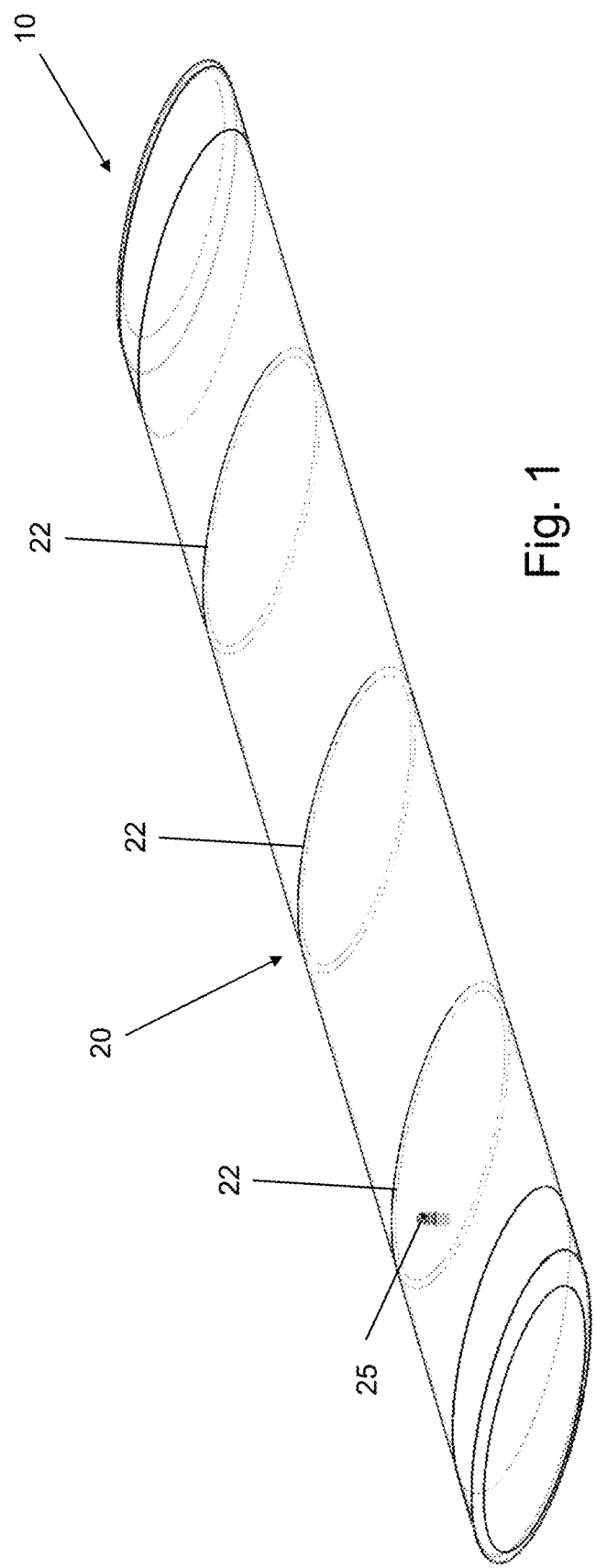
FIG. 1 is a perspective illustration of a flat-pack membrane float in a deflated position, the flat-pack membrane float having an internal expansion structure shown in a non-deployed position, wherein the internal expansion structure comprises flexible hoops bent into a compressed position.

FIG. 1 is a perspective illustration of a flat-pack membrane float 10 in a deflated state. In preferred embodiments, float 10 can optionally be made of HDPE, LDPE, PET, TPO, or EPDM. It is to be understood that other suitable membrane materials may be used as well. Float 10 may optionally have an internal scrim layer, and the scrim layer may be made of polyester.

The float 10 is deformable between an uninflated state/position and a fully inflated state/position. Float 10 is manufactured from membranes and then shipped in its uninflated state. The advantage of this is that many floats 10 can be stored in a small shipping volume, thereby reducing the shipping footprint. Once at the jobsite, floats 10 can be inflated such that they can form part of the support structure for an array of floating solar PV modules.

Figure 2:
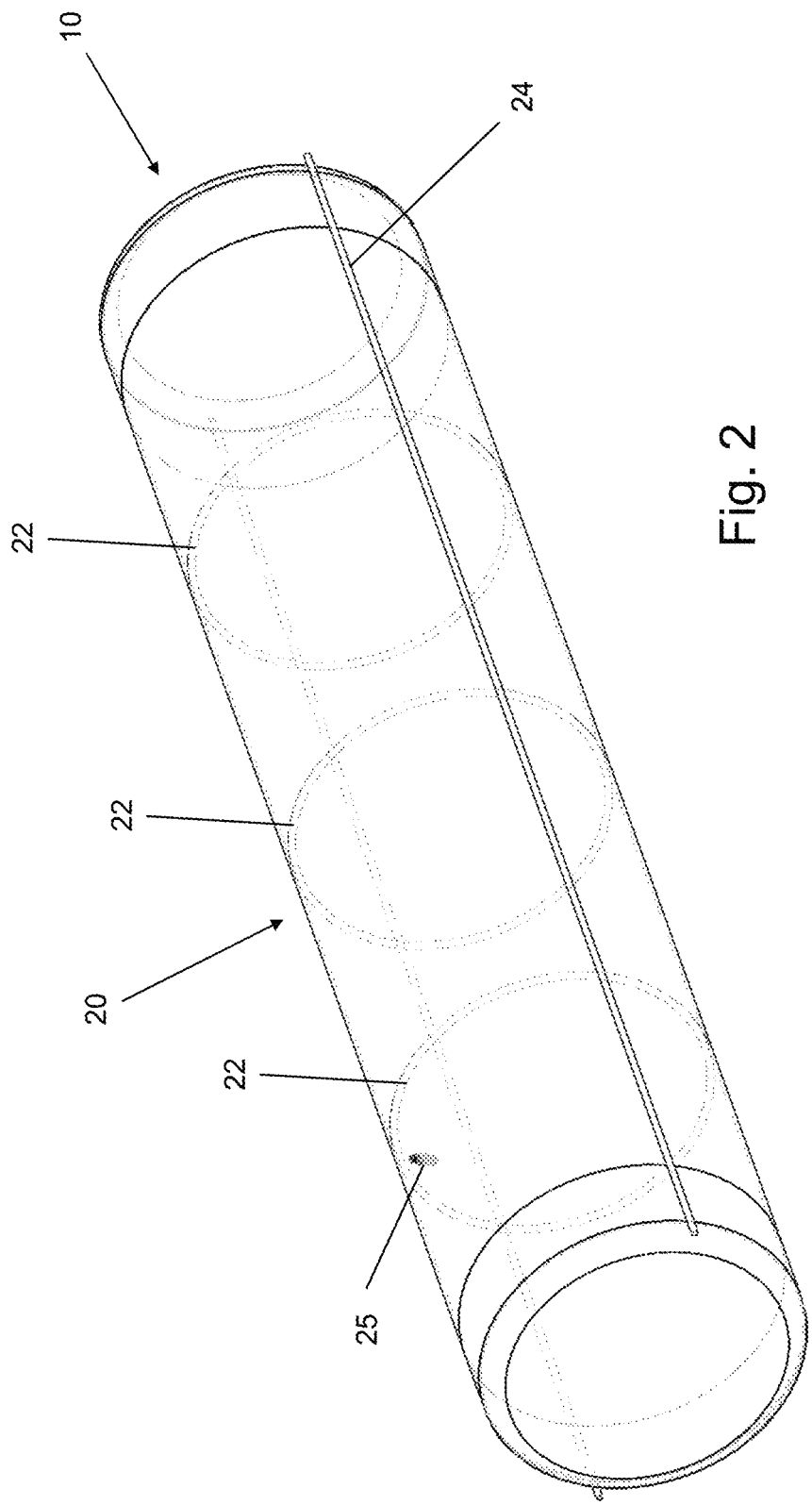
FIG. 2 is a perspective illustration of the flat-pack membrane of FIG. 1 in an inflated position with the internal expansion structure in a deployed position. The hoops are circular and are no longer compressed.

As illustrated in FIGS. 1 and 2, the flat-pack membrane float 10 is cylindrical (when inflated) and has an internal expansion structure 20 shown in a compressed, non-deployed position in FIG. 1 and in an expanded, deployed position in FIG. 2. As illustrated, expansion structure 20 comprises a series of flexible hoops 22 that are bent down into a compressed position (FIG. 1) and allowed to expand into a deployed (circular) position (FIG. 2). Hoops 22 may optionally be made of steel, nylon, or other suitable material.

Simply put, the hoops 22 are bent onto a non-circular position in FIG. 1. Once float 10 has been shipped to the jobsite, sealable air-entry valve 25 is opened. As hoops 22 then spring back into their circular state (FIG. 2), air will be drawn into float 10. Finally, when hoops 22 reach the fully expanded, circular position shown in FIG. 2, sealable air-entry valve 25 is closed. The advantage of this approach is that the expansion of hoops 22 pull the air into float 10. As such, compressed air is not required to inflate float 10. Instead, the mere opening (and then closing) of sealable air-entry valve 25 is all that is required to inflate float 10.

As can also be seen in FIG. 2, optional support poles 24 can also be attached to the exterior of float 10 after it has been inflated. The expansion system shown in FIGS. 1 and 2 is an example of an expansion system (hoops 22) that is positioned both within the float 10 (hoops 22) and outside the float (poles 24). In other approaches, hoops 22 may simply overlay one another when the float is deflated, and then be positioned as shown in FIG. 2 when an external expansion system such as poles 24 are inserted. Systems can also be devised similar to "pop-up" tents and clothes hampers where the rods move from a collapsed to an expanded position when they are no longer being held in a compacted state. In such embodiments, sealable air-entry valve 25 is opened and the float simply "pops-up" to its inflated position as the expansion structure inside the float pops-up into its expanded position. As can be appreciated, such an expansion structure 20 may increase in size when deployed.

Figure 3:
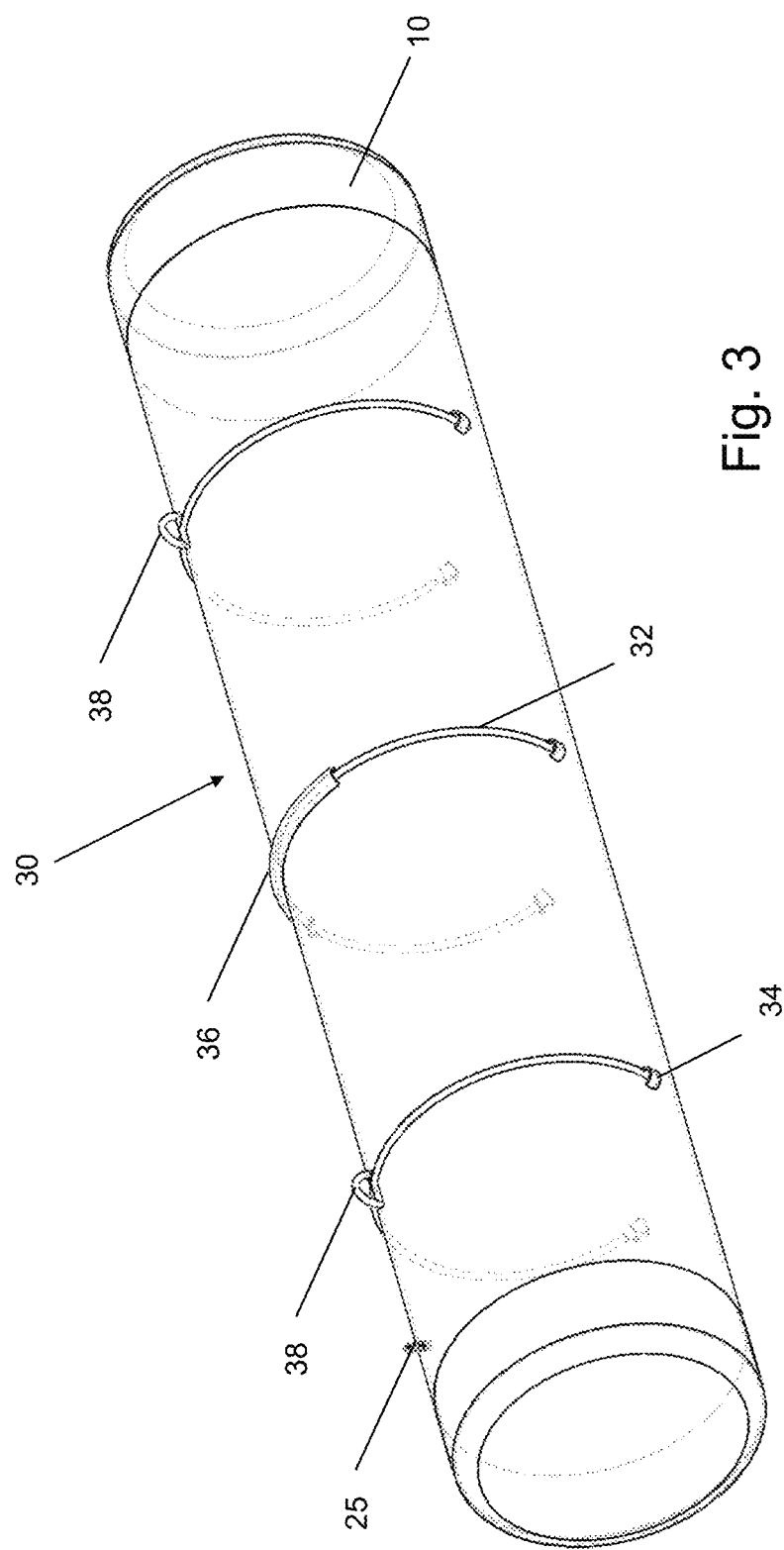
FIG. 3 is a perspective illustration of a flat-pack membrane float similar to FIG. 1 shown in an inflated position, wherein the flat-pack membrane float instead has an external expansion structure (shown in a deployed position). The expansion structure comprises poles, pockets, sleeves and clips on the exterior surface of the flat-pack membrane float.

FIGS. 3 and 4 illustrate an expansion system 30 that is instead positioned outside (i.e.: around an exterior surface of) float 10, as follows. FIG. 3 is a perspective illustration of a flat-pack membrane float 10 in an inflated position, with an external expansion structure 30 in a fully deployed position. In this exemplary embodiment, the expansion structure 30 optionally comprises poles 32, pockets 34, sleeves 36 and clips 38 at the exterior surface of the flat-pack membrane float 10. First, flexible poles 32 are initially straight and may resemble "tent poles" in fabrication. In one preferred aspect, one end of each pole 32 is inserted into a pocket 34. Pole 32 bends such that the other end of the pole 32 is inserted into another pocket 34. As such, the flexible pole 32 will bend into a curved shape around float 10. In addition, flexible curved pole 32 may be held onto the exterior surface of float 10 by one or more clips 38 (positioned at various locations around the circumference of the float). In another preferred aspect, clip 38 can be replaced by one of more short sleeves 36 (which also hold flexible pole 32 against the curved circumference of float 10). In addition, a long sleeve 36 may instead go almost all around the whole circumference of float 10. In this embodiment, poles 32 are inserted into sleeves 36 and are held securely around the circumference of float 10 without having to secure the ends of poles 32 in any pockets 34.

In the embodiments of FIGS. 3 and 4, the simple act of attaching poles 32 to an exterior surface of float 10 (using pockets 34, sleeves 36 or clips 38) will pull float 10 into its expanded (i.e.: inflated) state. As such, simply attaching or inserting poles 32 around float 10 will cause float 10 to inflate (after sealable air-entry valve 25 has been opened). As can be seen in FIGS. 1 to 4, the expansion structure 20 or 30 will have the same general shape as the float when the expansion structure has been deployed. It is to be understood as well that poles 32, sleeves 36 and clips 38 may instead be positioned fully or partially within the interior of float 10. In yet another optional embodiment, sleeves 36 are instead filled with a setting foam or pressurized liquid (instead of having poles 32 being inserted into the sleeves 36).

FIG. 4 is an illustration of a flat-pack membrane float 10 in a deflated (i.e. flattened) position, showing sleeves 36 and pockets 34 welded thereon during initial manufacture of the float. A fastener securing clip 38 may also be welded onto the exterior of float 10 as well. (It is to be understood that FIG. 4 is only illustrative and additional sleeves, pockets and clip fasteners may also be welded around the surface of float 10 at various locations as required).

Figure 11A:
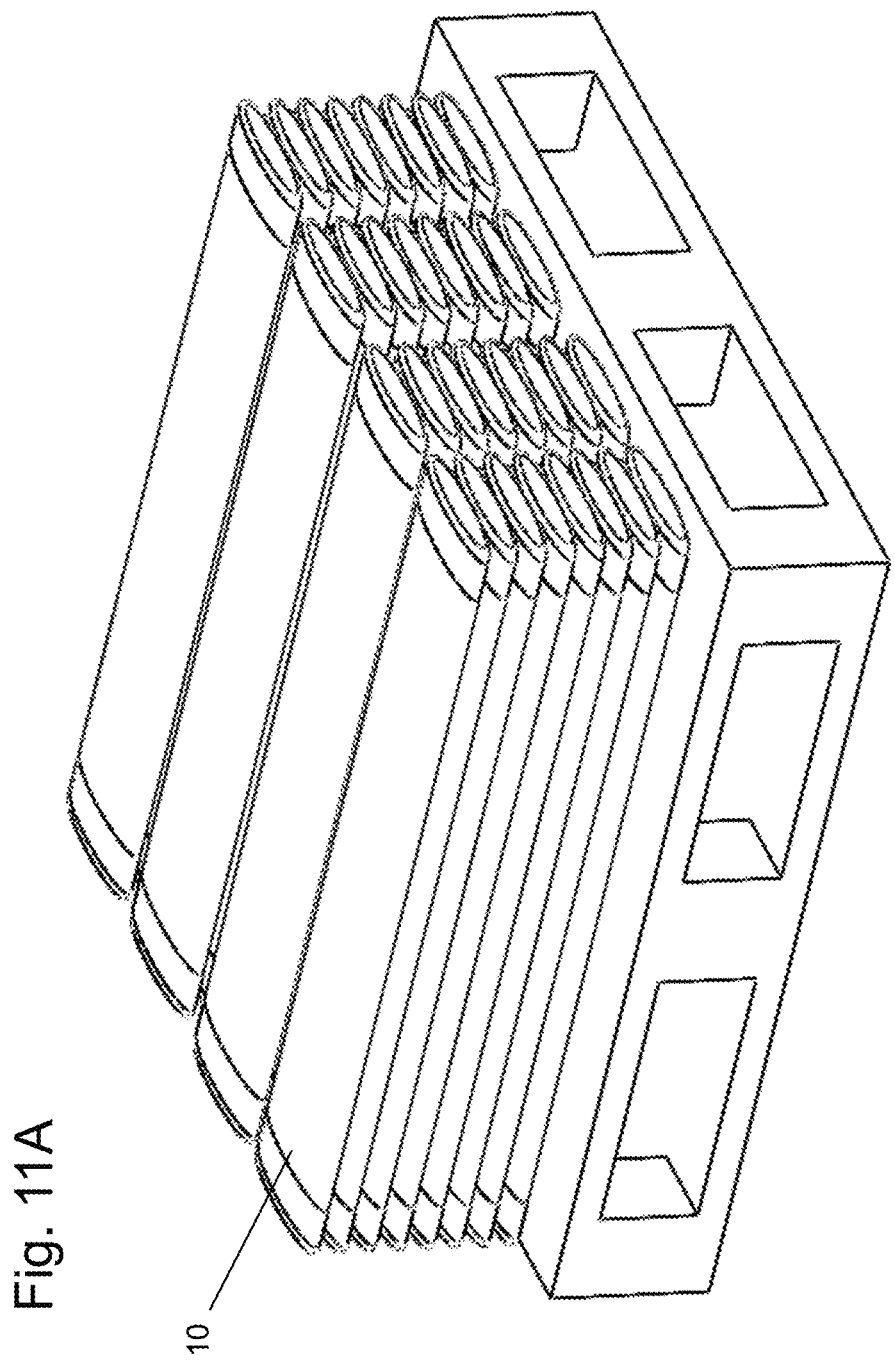
FIG. 11A is an illustration of a stack of flat-packed membrane floats of FIGS. 1 and 2 on a shipping pallet.
Figure 11B:
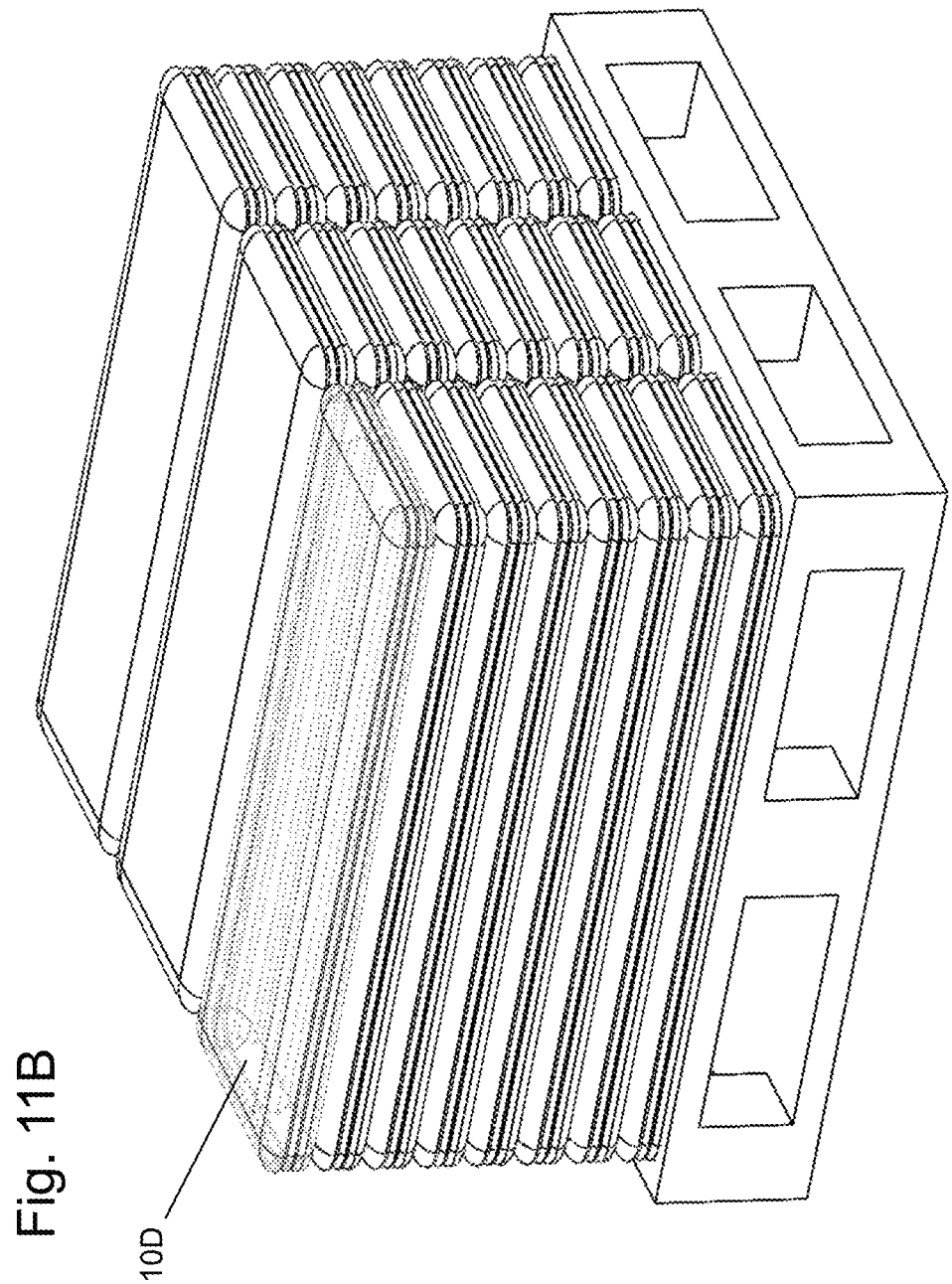
FIG. 11B is an illustration of a stack of flat-packed membrane floats of FIGS. 11A to 11D on a shipping pallet.

FIGS. 5A to 5C illustrate a second embodiment of an expansion structure in which hoops 22 are pre-installed into float 10 and the float 10 deploys in an "accordion" fashion as follows. First, FIG. 5A shows flat-pack membrane float 10 in its deflated state. At this time, hoops 22 are positioned close together. Next, rods 24 are inserted to run along the exterior of the float. Once rods 24 have been fully inserted into sleeves (not shown) running lengthwise along the exterior surface of float 10, float 10 therefore expands to the fully inflated position shown in FIG. 5B. Inserting rods 24 into sleeves running lengthwise on the float simply causes parallel hoops 22 to move farther apart as the float inflates. Finally, FIG. 5C shows a PV module 40 mounted onto the top of the fully deployed (i.e.: inflated) float 10 of FIG. 5B. Parallel hoops 22 and parallel rods 24 may optionally be made of any one of Steel, Aluminum, Nylon, polyvinyl chloride (PVC), Fiberglass, or other suitable material. The advantage of this particular embodiment is that the float (as seen in FIG. 5A) can be packed flat in its deflated state for shipping to a jobsite (as seen in FIG. 11A).

Figure 6B:
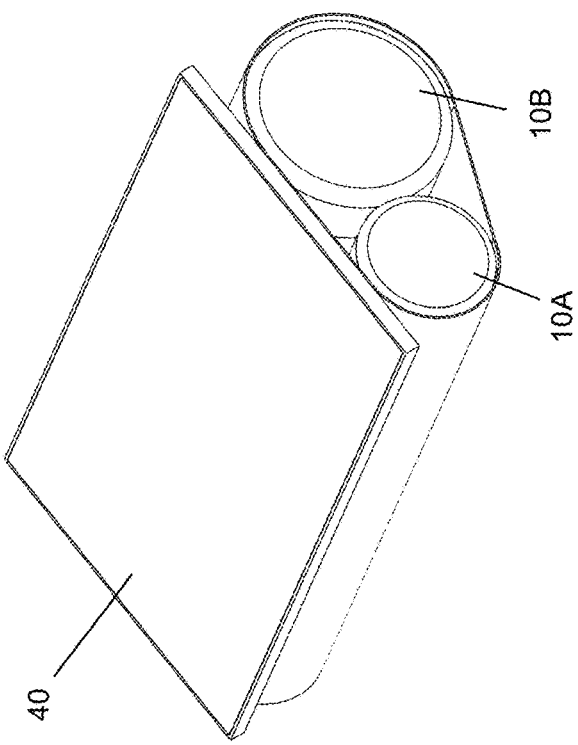
FIG. 6B is an illustration of a PV module mounted onto the pair of cylindrical floats in FIG. 6A.
Figure 6A:
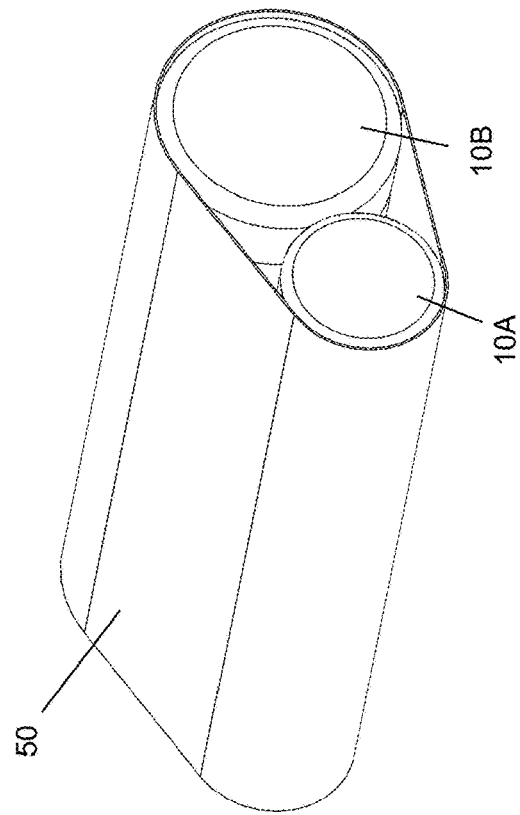
FIG. 6A is a perspective view of a membrane wrapped around two cylindrical floats of different sizes.

FIGS. 6A and 6B illustrate an optional membrane 50 wrapped around two cylindrical floats 10A and 10B of different sizes. Membrane 50 can be made of HDPE, LDPE, PET, TPO, or EPDM, or other suitable material. FIG. 6B is an illustration of a PV module 40 mounted onto the pair of wrapped together cylindrical floats 10A and 10B of FIG. 6A. As can be appreciated, the optimal or desired angle of PV module 40 to the sun can be set simply by selecting the optimal or desired circumference of each of cylindrical float 9A and 9B.

FIGS. 7A to 7D show various preferred arrangements of floats and PV modules in two adjacent rows of a floating solar PV array. Only two rows of PV modules are illustrated, and it is to be understood that the patterns illustrated in FIGS. 7A to 7D are simply repeated. It is also to be understood that other arrangements of floats 10 and PV modules 40 are also contemplated, all keeping within the scope of the present invention.

Figure 7C:
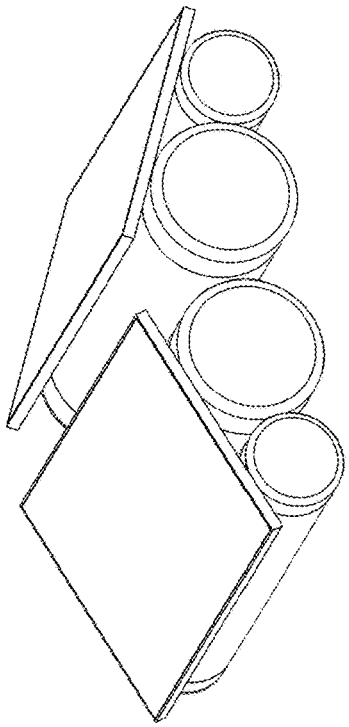
FIG. 7C is a simplified illustration similar to FIG. 7A, but with the rows instead positioned to be east-west facing.
Figure 7D:
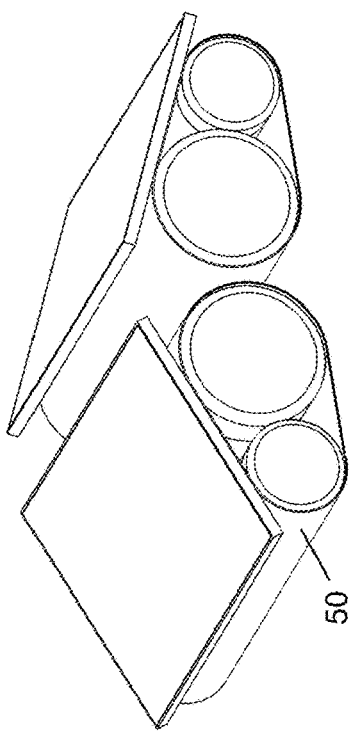
FIG. 7D is a simplified illustration similar to FIG. 7C, but with a membrane wrapped around the pair of cylindrical floats.
Figure 7A:
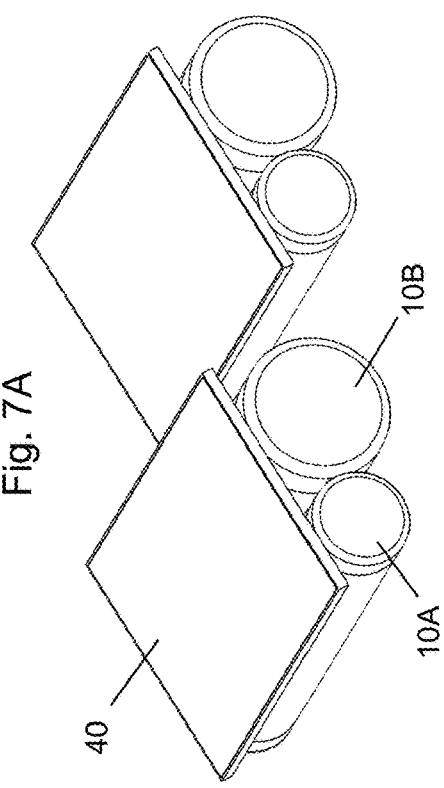
FIG. 7A is a simplified illustration of two rows of south-facing PV modules, with each PV module mounted onto a pair of cylindrical floats.
Figure 7B:
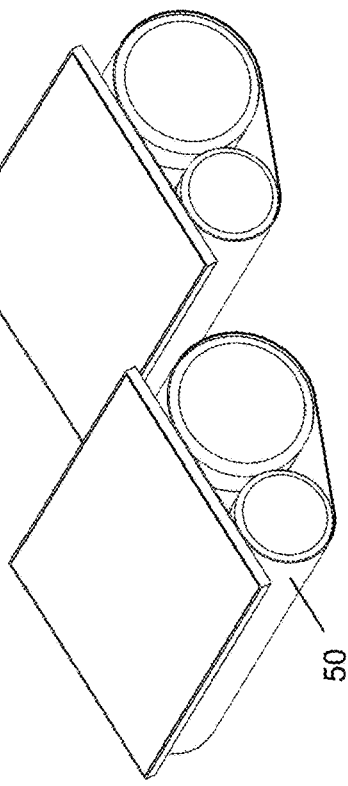
FIG. 7B is a simplified illustration similar to FIG. 7A, but with a membrane wrapped around the pair of cylindrical floats.

First, FIG. 7A is an illustration of two rows of PV modules facing the same direction, with each PV module 40 mounted onto a pair of cylindrical floats 10A and 10B. FIG. 7B is an illustration similar to FIG. 8A, but with a membrane 50 wrapped around the pair of cylindrical floats 10A and 10B holding them together. FIG. 7C is an illustration similar to FIG. 7A, but with the rows instead positioned to be east-west facing. Lastly, FIG. 7D is an illustration similar to FIG. 7C, but with a membrane 50 wrapped around the pair of cylindrical floats 9A and 9B. When facing the same direction, the tilt angle of PV modules 40 is simply repeated from one row to the next. When east-west facing the tilt angle of PV modules 40 is simply mirrored from one row to the next.

Next, FIGS. 8A to 8D illustrate various arrangements for two rows of PV modules 40 in a floating array, with various embodiments using differently sized cylindrical floats 10A and 10B, or by sharing the same sized floats 10A, as follows. First, FIG. 8A illustrates two rows of PV modules 40 facing the same direction, with each PV module 40 supported by a pair of differently sized floats 10A and 10B. Next, FIG. 8B illustrates two rows of PV modules 40 facing the same direction, with each PV module 40 supported by shared floats 10A of the same size. Next, FIG. 8C illustrates two east-west facing rows of PV modules 40, with each PV module 40 supported by shared floats 10A and 10B of different sizes. Finally, FIG. 8D illustrates two east-west facing rows of PV modules 40, with each PV module 40 supported by shared floats 10A of the same size.

Figure 9A:
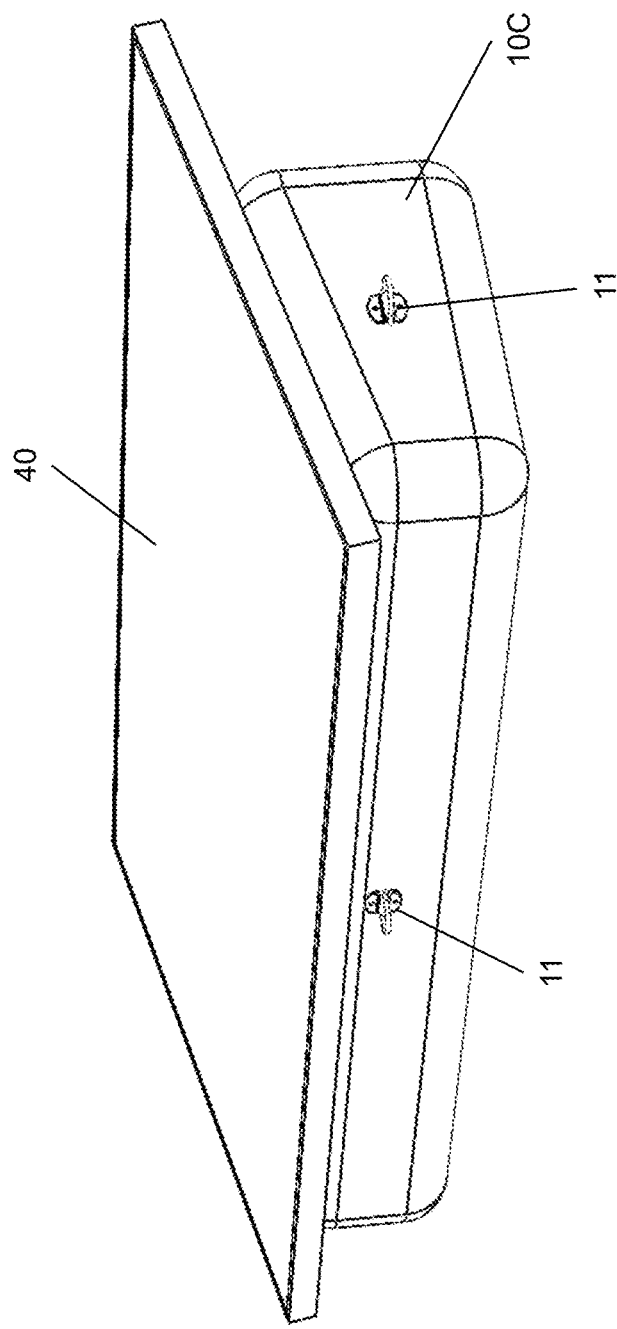
FIG. 9A is an illustration of a PV module mounted onto a trapezoidal-shaped membrane float.
Figure 9C:
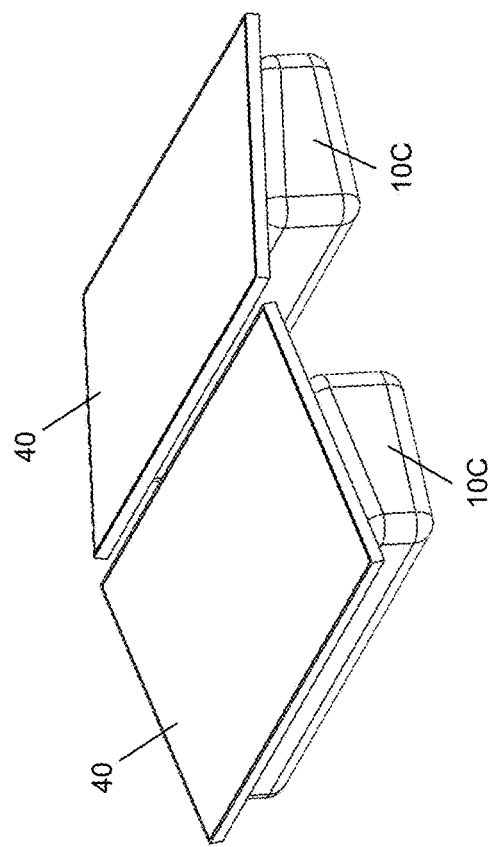
FIG. 9C is a simplified illustration similar to FIG. 9B, but with the rows instead positioned to be east-west facing.
Figure 9B:
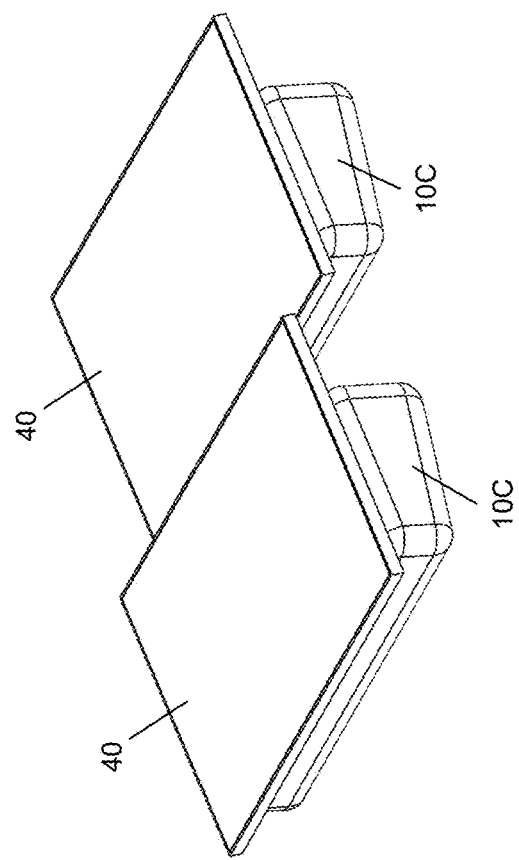
FIG. 9B is a simplified illustration of two rows of south-facing PV modules, with each PV module mounted onto a trapezoidal-shaped membrane float.

Next, FIGS. 9A to 9C illustrate a trapezoidal-shaped float 10C according to the present invention. First, FIG. 9A is an illustration of a PV module 40 mounted onto a trapezoidal-shaped float 10C. Trapezoidal-shaped float 10C has the advantage of being "wedge-shaped", i.e.: having a top surface that is angled to its bottom surface. This has the advantage of providing an angled surface onto which PV module 40 is mounted such that PV module 40 will be angled at a preferred orientation to the sun. FIG. 9B illustrates two rows of PV modules 40 facing the same direction on trapezoidal-shaped floats 10C, and FIG. 9C illustrates the rows of modules 40 instead being positioned to be east-west facing. As seen in FIG. 9A, fasteners 11 may optionally be provided at the corners or edges or sides of float 10C. Fasteners 11 may be used for elastically connecting float 10C to structural members of a grid array as disclosed in co-pending patent application Ser. No. 18/495,582, entitled Structural Support Grid for Floating Solar Array, filed Oct. 6, 2023, the entire disclosure of which is incorporated herein by reference in its entirety for all purposes.

FIGS. 10A to 10D show another embodiment of a float for use with the present invention. Specifically, FIG. 10A shows a perspective view of a rectangular-shaped float 10D in its fully inflated state. FIG. 10B is a sectional elevation view of the rectangular-shaped float of FIG. 10A in its deflated state, showing collapsed internal ribs 60. FIG. 10C is a sectional elevation view of the rectangular-shaped float 10D of FIG. 10A in its inflated position, showing expanded internal ribs 60. It is to be understood that ribs 60 can be designed to straighten and expand (moving float 10D from the collapsed state of FIG. 10B to the deployed and expanded state of FIG. 10C). Internal ribs 60 may optionally be load bearing when fully deployed. Lastly, FIG. 10D illustrates the method of manufacturing the rectangular-shaped float 10D of FIG. 10A. Specifically, the ends of ribs 60 are simply welded onto the membrane at seams 61. Next, the side edges of the membrane are folded over as shown in FIG. 10E and welded together at seam 63. Finally, the longitudinal ends of the float can be welded together or covered with caps.

FIG. 12A is an illustration of a triangular-shaped membrane float 10E. In this embodiment, the external three-member expansion structure 70 of FIG. 12B is attached to the side of triangular-shaped membrane float of FIG. 13A. In this embodiment, expansion structure 70 comprises members 71, 72 and 73 which may optionally be made of any one of Steel, Aluminum, Nylon, PVC, Fiberglass or other suitable material. In this embodiment, float 10E has straight edges and expandable frame 70 is positioned at the side edge of float with members 71, 72, and 73 being positioned 10E as shown. A plurality of cotter pins 74 may be used to hold the elongated members together when the float is in its inflated position.

Figure 13:
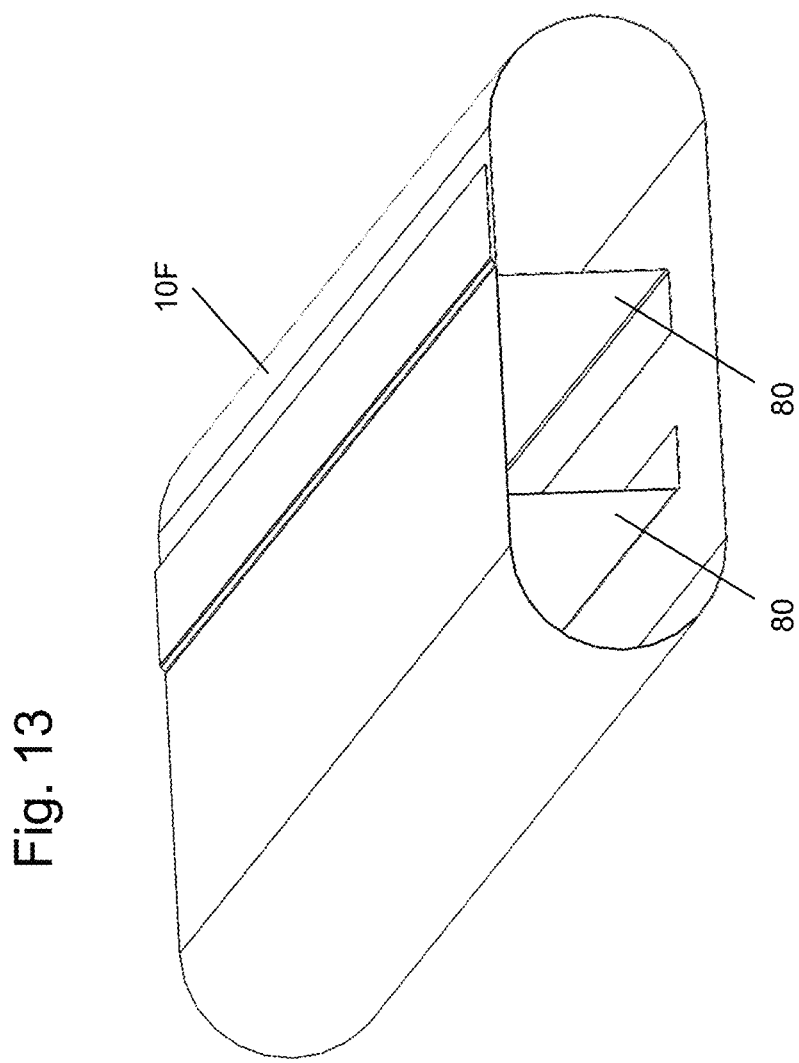
FIG. 13 is a sectional perspective view of a flat-packed membrane float having internal walls.

FIG. 13 is a sectional perspective view of a flat-packed membrane float 10F having internal walls 80. In preferred aspects, the internal wall 80 is folded upon itself when the float is in its deflated state, and which may bear a portion of the weight of a PV module mounted onto the float when the float is fully inflated. Internal walls 80 may be formed by welding membrane material to the top and bottom of the float before the float is sealed. In other preferred aspects, the float may have a plurality of internal chambers.

Figure 14C:
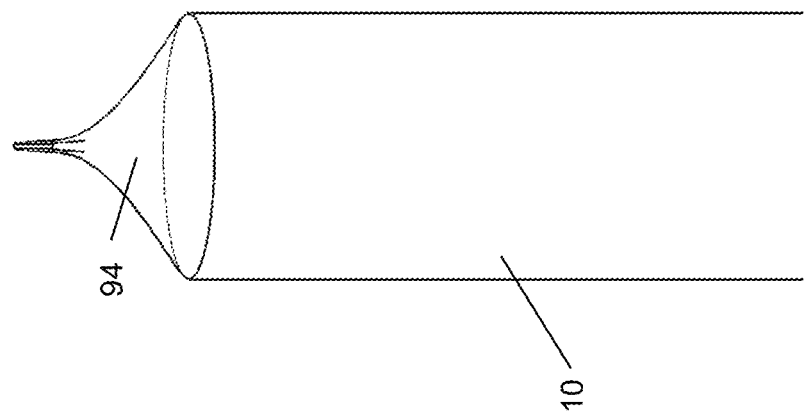
FIG. 14C is perspective view of a cylindrical-shaped float having a pinched-seam end cap.
Figure 14B:
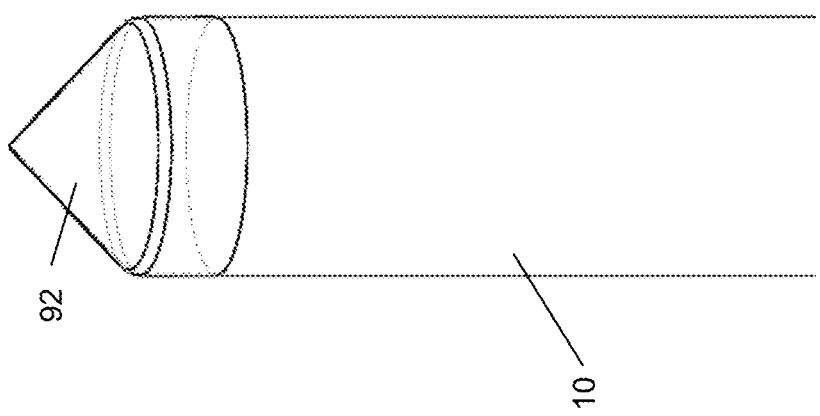
FIG. 14B is perspective view of a cylindrical-shaped float having a conical end cap.
Figure 14A:
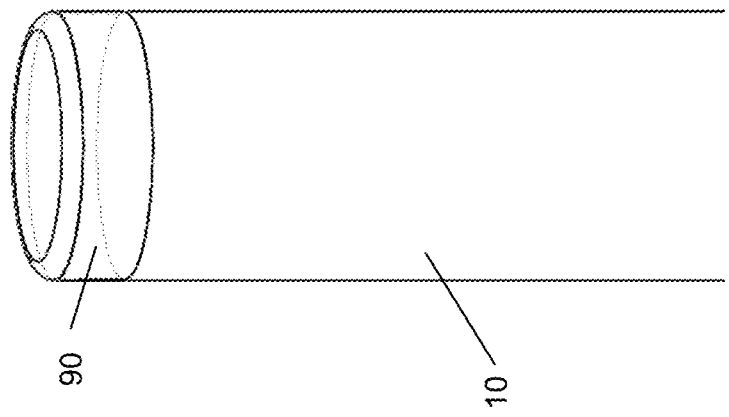
FIG. 14A is perspective view of a cylindrical-shaped float having a circular end cap.

FIGS. 14A to 14C show various approaches for sealing the ends of a cylindrical float (such as in FIG. 1). Specifically, FIG. 14A is perspective view of a cylindrical-shaped float having a circular end cap 90. FIG. 14B is perspective view of a cylindrical-shaped float having a conical end cap 92. Lastly, FIG. 14C is perspective view of a cylindrical-shaped float having a pinched-seam end cap 94.

What is claimed is:

1. An expandable flat-pack membrane-based float system for use with a floating solar PV array, comprising:
   a float formed from a flexible membrane, wherein the float can be deformed between an uninflated flat-pack position and an inflated position;
   a sealable air-entry valve on the float; and
   an expansion structure connected to the float, wherein the expansion structure is deployed to support the float in the inflated position without the need for compressed air, and
   wherein the float is configured to support a PV module that is mounted at a location outside of the float.

2. The float system of claim 1, wherein the flexible membrane is made of any one of:
   HDPE, LDPE, PET, TPO or EPDM.

3. The float system of claim 1, wherein the expansion structure is positioned within the float.

4. An expandable flat-pack membrane-based float system for use with a floating solar PV array, comprising:
   a float formed from a flexible membrane, wherein the float can be deformed between an uninflated flat-pack position and an inflated position;
   a sealable air-entry valve on the float; and
   an expansion structure connected to the float, wherein the expansion structure is deployed to support the float in the inflated position without the need for compressed air, wherein the expansion structure is positioned around an exterior surface of the float.

5. The float system of claim 1, wherein the float is inflated by opening the sealable air-entry valve to permit air to enter the float when the expansion structure is deployed.

6. An expandable flat-pack membrane-based float system for use with a floating solar PV array, comprising:
   a float formed from a flexible membrane, wherein the float can be deformed between an uninflated flat-pack position and an inflated position;
   a sealable air-entry valve on the float; and
   an expansion structure connected to the float, wherein the expansion structure is deployed to support the float in the inflated position without the need for compressed air, wherein the expansion structure has the same shape as the float when the float is in its inflated position and the expansion structure has been deployed.

7. The float system of claim 1, wherein the float is cylindrical.

8. An expandable flat-pack membrane-based float system for use with a floating solar PV array, comprising:
   a float formed from a flexible membrane, wherein the float can be deformed between an uninflated flat-pack position and an inflated position;
   a sealable air-entry valve on the float; and
   an expansion structure connected to the float, wherein the expansion structure is deployed to support the float in the inflated position without the need for compressed air, wherein the float is trapezoidal in shape with an angled top surface.

9. The float system of claim 1, wherein the float supports a single PV module mounted thereon.

10. The float system of claim 1, wherein a pair of floats support a single PV module mounted thereon.

11. An expandable flat-pack membrane-based float system for use with a floating solar PV array, comprising:

a float formed from a flexible membrane, wherein the float can be deformed between an uninflated flat-pack position and an inflated position;
a sealable air-entry valve on the float; and
an expansion structure connected to the float, wherein the expansion structure is deployed to support the float in the inflated position without the need for compressed air, further comprising:
a membrane wrapping around the pair of floats.

12. An expandable flat-pack membrane-based float system for use with a floating solar PV array, comprising:
a float formed from a flexible membrane, wherein the float can be deformed between an uninflated flat-pack position and an inflated position;
a sealable air-entry valve on the float; and
an expansion structure connected to the float, wherein the expansion structure is deployed to support the float in the inflated position without the need for compressed air, further comprising:
fasteners at corners or edges of the float for elastically connecting the float to structural members of a grid array.

13. An expandable flat-pack membrane-based float system for use with a floating solar PV array, comprising:
a float formed from a flexible membrane, wherein the float can be deformed between an uninflated flat-pack position and an inflated position;
a sealable air-entry valve on the float; and
an expansion structure connected to the float, wherein the expansion structure is deployed to support the float in the inflated position without the need for compressed air, wherein the expansion structure comprises:
an expandable frame that is folded when the float is in its uninflated position and is unfolded when the float is in its inflated position.

14. An expandable flat-pack membrane-based float system for use with a floating solar PV array, comprising:
a float formed from a flexible membrane, wherein the float can be deformed between an uninflated flat-pack position and an inflated position;
a sealable air-entry valve on the float; and
an expansion structure connected to the float, wherein the expansion structure is deployed to support the float in the inflated position without the need for compressed air, wherein the float is cylindrical and the expansion structure comprises a series of compressible hoops inside the float.

15. An expandable flat-pack membrane-based float system for use with a floating solar PV array, comprising:
a float formed from a flexible membrane, wherein the float can be deformed between an uninflated flat-pack position and an inflated position;
a sealable air-entry valve on the float; and
an expansion structure connected to the float, wherein the expansion structure is deployed to support the float in the inflated position without the need for compressed air, wherein the float is cylindrical and the expansion structure comprises:
a series of poles wrapped around the exterior surface of the float, and
a mounting system for connecting the series of poles to an exterior surface of the float.

16. The float system of claim 15, wherein the mounting system comprises at least one of:
pockets on an exterior surface of the float,
sleeves on the exterior surface of the float, or
attachment clamps on the exterior surface of the float.

17. An expandable flat-pack membrane-based float system for use with a floating solar PV array, comprising:
a float formed from a flexible membrane, wherein the float can be deformed between an uninflated flat-pack position and an inflated position;
a sealable air-entry valve on the float; and
an expansion structure connected to the float, wherein the expansion structure is deployed to support the float in the inflated position without the need for compressed air, wherein the float is cylindrical and the expansion structure comprises:
a series of parallel hoops wrapping around the circumference of the float, wherein the parallel hoops are positioned close together when the float is in its uninflated position, and wherein the parallel hoops are positioned farther apart when the float is in its inflated position.

18. The float system of claim 1, wherein the float has an internal wall.

19. The float system of claim 1, wherein the float has a plurality of internal chambers.

20. An expandable flat-pack membrane-based float system for use with a floating solar PV array, comprising:
a float formed from a flexible membrane, wherein the float can be deformed between an uninflated flat-pack position and an inflated position;
a sealable air-entry valve on the float; and
an expansion structure connected to the float, wherein the expansion structure is deployed to support the float in the inflated position without the need for compressed air, wherein the expansion structure comprises:
an expandable frame connected to an exterior surface of the float.

* * * * *

UNITED STATES PATENT AND TRADEMARK OFFICE
CERTIFICATE OF CORRECTION

| | | |
|---|---|---|
| PATENT NO. | : 12,110,082 B1 | Page 1 of 1 |
| APPLICATION NO. | : 18/516275 | |
| DATED | : October 8, 2024 | |
| INVENTOR(S) | : Alex Mayer et al. | |

It is certified that error appears in the above-identified patent and that said Letters Patent is hereby corrected as shown below:

On the Title Page

The Title and in the Specification, Column 1, Lines 1-5, read:
FLAT-PACK MEMBRANE BASED SOLAR PV ARRAY FLOATS HAVING DEPLOYABLE EXPANSION STRUCTURES THAT INFLATE THE FLOATS WITHOUT FORCED AIR PRELIMINARY CLASS
And it should read:
--FLAT-PACK MEMBRANE BASED SOLAR PV ARRAY FLOATS HAVING DEPLOYABLE EXPANSION STRUCTURES THAT INFLATE THE FLOATS WITHOUT FORCED AIR--.

Signed and Sealed this
Seventh Day of October, 2025

John A. Squires
*Director of the United States Patent and Trademark Office*